(12) United States Patent
Nishimura et al.

(10) Patent No.: US 10,699,815 B2
(45) Date of Patent: Jun. 30, 2020

(54) NOZZLE SEAL STRUCTURE (71) Applicant: MITSUBISHI HEAVY INDUSTRIES, LTD., Tokyo (JP)

(72) Inventors: Tadaaki Nishimura, Tokyo (JP); Masaya Yamaguchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 237 days.

(21) Appl. No.: 15/553,696

(22) PCT Filed: Sep. 1, 2015

(86) PCT No.: PCT/JP2015/074886
§ 371 (c)(1),
(2) Date: Aug. 25, 2017

(87) PCT Pub. No.: WO2016/151886
PCT Pub. Date: Sep. 29, 2016

(65) Prior Publication Data
US 2018/0047468 A1 Feb. 15, 2018

(30) Foreign Application Priority Data
Mar. 26, 2015 (JP) .................. 2015-064973

(51) Int. Cl.
*G21C 13/036* (2006.01)
*G21C 13/067* (2006.01)
(Continued)

(52) U.S. Cl.
CPC ......... *G21C 13/036* (2013.01); *G21C 13/028* (2013.01); *G21C 13/067* (2013.01); *G21C 17/10* (2013.01); *Y02E 30/40* (2013.01)

(58) Field of Classification Search
CPC ... G21C 13/028; G21C 13/036; G21C 13/067
See application file for complete search history.

(56) References Cited

U.S. PATENT DOCUMENTS

| 4,743,054 A | 5/1988 | Lavalerie |
| 4,812,285 A | 3/1989 | Stapleton |

(Continued)

FOREIGN PATENT DOCUMENTS

| DE | 4303597 A1 * | 3/1994 | ........... G21C 13/036 |
| JP | 58-47795 A | 3/1983 | |

(Continued)

OTHER PUBLICATIONS

Search Report dated Nov. 2, 2017, issued in counterpart International Application No. PCT/JP2015/074886, with English translation (6 pages).

(Continued)

*Primary Examiner* — Sharon M Davis
(74) *Attorney, Agent, or Firm* — Westerman, Hattori, Daniels & Adrian, LLP (57) ABSTRACT

A nozzle seal structure hermetically seals an instrumentation nozzle provided in a manner penetrating a reactor vessel from inside to outside and has a support post inserted therethrough. The instrumentation nozzle includes a flange portion projecting outward in a radial direction orthogonal to a nozzle axis direction at an end portion on an outer side of the reactor vessel.

5 Claims, 7 Drawing Sheets

(51) Int. Cl.
    *G21C 13/028*     (2006.01)
    *G21C 17/10*     (2006.01)

(56) References Cited

U.S. PATENT DOCUMENTS

| | | | | |
|---|---|---|---|---|
| 4,978,494 A | * | 12/1990 | Rinker | G21C 7/16 |
| | | | | 376/235 |
| 5,748,689 A | | 5/1998 | Malmasson | |
| 5,828,711 A | * | 10/1998 | Malmasson | G21C 13/036 |
| | | | | 376/204 |

FOREIGN PATENT DOCUMENTS

| | | |
|---|---|---|
| JP | 58-47795 U1 | 3/1983 |
| JP | 60-205287 A | 10/1985 |
| JP | 61-48397 U1 | 4/1986 |
| JP | 62-93572 A | 4/1987 |
| JP | 8-029581 A | 2/1996 |
| KR | 10-1996-0012037 | 4/1996 |

OTHER PUBLICATIONS

Written Opinion dated Nov. 2, 2015, issued in counterpart Application No. PCT/JP2015/074886, with English ranslation (9 pages).
Office Action dated Mar. 17, 2019, issued in KR Application No. 10-2017-7023379, with English translation (9 pages).
Robert Sisk; "AP1000 Response to Request for Additional Information (RAI) (SRP 5)", Westinghouse, Jan. 15, 2010, 17 pages.
Office Action dated Mar. 19, 2019, issued in counterpart JP Application No. 2015-064973, with English translation (6 pages).

\* cited by examiner

NOZZLE SEAL STRUCTURE

FIELD

The present invention relates to a nozzle seal structure adapted to hermetically seal a nozzle provided in a manner penetrating a reactor vessel from inside to outside.

BACKGROUND

In the related art, a clamp system using two clamps is known (refer to Patent Literature 1, for example). The clamp system is provided with the clamps to seal an interface between two tubular conduits, and includes the clamp on an upper side and the clamp on a lower side.

CITATION LIST

Patent Literature

Patent Literature 1: U.S. Pat. No. 4,812,285

SUMMARY

Technical Problem

Here, in a clamp system of Patent Literature 1, a conduit provided between a clamp on an upper side and a clamp on a lower side is a cylindrical member. This cylindrical member has an upper seal provided on the upper side and a lower seal provided on the lower side. Thus, in the case where the upper seal and the lower seal are provided respectively on the upper side and the lower side of the cylindrical member, there may be difficulty in visibility. Specifically, in the case of checking states of the upper seal and the lower seal, or in the case of checking clamped states of the upper seal and the lower seal, it may be difficult to visually check the upper seal when visual check is performed from the lower side of the cylindrical member because the upper seal is located at a deep position. Therefore, for example, a foreign matter such as dust caught by the seal member may be hardly grasped, and reliability of sealing performance by the seal member may be degraded.

Considering above, the present invention is directed to providing a nozzle seal structure capable of improving visibility of a first seal member and a second seal member.

Solution to Problem

A nozzle seal structure of the present invention is configured to hermetically seal a nozzle provided in a manner penetrating a reactor vessel from inside to outside and having a rod member inserted through, the nozzle including a flange portion projecting outward in a radial direction orthogonal to a nozzle axis direction at an end portion on an outer side of the reactor vessel, and the nozzle seal structure includes a blocking member provided in a manner facing the flange portion in the nozzle axis direction and having a center portion through which the rod member inserted, a first seal member provided between the flange portion and the blocking member, a second seal member provided between the rod member and the blocking member, a first fastening portion configured to fasten the flange portion and the blocking member, and a second fastening portion configured to fasten the rod member and the blocking member. The blocking member is formed in a plate shape in which the nozzle axis direction coincides with a thickness direction.

According to this structure, since the blocking member is formed in a plate shape, a distance in the nozzle axis direction between the first seal member and the second seal member can be shortened compared to a case where the blocking member is formed in a cylindrical shape. Therefore, since the first seal member and the second seal member can be set close to each other, visual check for the first seal member and the second seal member can be appropriately performed when visually check is performed from the side where the first seal member and the second, seal member of the blocking member are arranged. Therefore, since visibility of the first seal member and the second seal member can be improved, for example, visual inspection and the like can be appropriately performed.

Further, it is preferable that the blocking member includes a first fastened surface configured to receive first fastening force applied by a first fastening portion, and a second fastened surface configured to receive second fastening force applied by a second fastening portion. The first fastened surface and the second fastened surface are formed on the same surface.

According to this structure, since the first fastened surface and the second fastened surface are formed on the same surface, fastening work for the first fastening portion and the second fastening portion can be performed on the same surface. Consequently, workability can be improved. Furthermore, since the first fastened surface and the second fastened surface are formed on the same surface, the shape of the blocking member can be made compact consequently, space saving can be achieved.

Further, it is preferable that the blocking member is formed in a disk shape having a center where the rod member is made to penetrate, and the second fastening portion includes a second hydraulic lock mechanism arranged in the center of the blocking member.

According to this structure, the second seal member between the rod member and the blocking member can be clamped by fastening the rod member and the blocking member with the second hydraulic lock mechanism, and thus the space between the rod member and the blocking member can be hermetically sealed. At this point, since the second hydraulic lock mechanism can apply the second fastening force by hydraulic pressure, pressure can be uniformly applied along the circumference of the rod member without unevenly applying a load to the second seal member in the circumference of the rod member. Therefore, reliability of sealing performance by the second seal member can be improved.

Further, it is preferable that the second fastening portion further includes a locking member configured to lock the second hydraulic lock mechanism and the rod member.

According to this structure, the second hydraulic lock mechanism can be locked to the rod member by the locking member. Therefore, the second hydraulic lock mechanism can move the rod member via the locking member.

Further, it is preferable that the blocking member is formed in a disk shape having a center where the rod member is made to penetrate, and the first fastening portion includes a plurality of first hydraulic lock mechanisms arranged around the blocking member.

According to this structure, since the first seal member between the flange portion and the blocking member can be clamped by fastening the flange portion and the blocking member with the plurality of first hydraulic lock mechanisms, and the space between the flange portion and the blocking member can be hermetically sealed. At this point, since the plurality of first hydraulic lock mechanisms can apply the first fastening force by hydraulic pressure, pressure can be uniformly applied along the circumference of the flange portion without unevenly applying a load to the first seal member in the circumference of the flange portion. Therefore, reliability of sealing performance by the first seal member can be improved.

Further, it is preferable that hydraulic pressure of a same level is collectively applied to the plurality of first hydraulic lock mechanisms.

According to this structure, since hydraulic pressure of the same level is collectively applied to the plurality of first hydraulic lock mechanisms, the pressure can be uniformly applied along the circumference of the flange portion without unevenly applying a load to the first seal member in the circumference of the flange portion.

DESCRIPTION OF EMBODIMENTS

An embodiment of the present invention will be described below in detail based on the attached drawings. Note that the present invention is not limited by this embodiment. Additionally, components in the following embodiment include a component which can be replaced and easily achieved by a person skilled in the art or component substantially equivalent thereto. Furthermore, the components described below can be suitably combined, and in the case of having a plurality of embodiments, the respective embodiments can also be combined.

Embodiment

Figure 1:
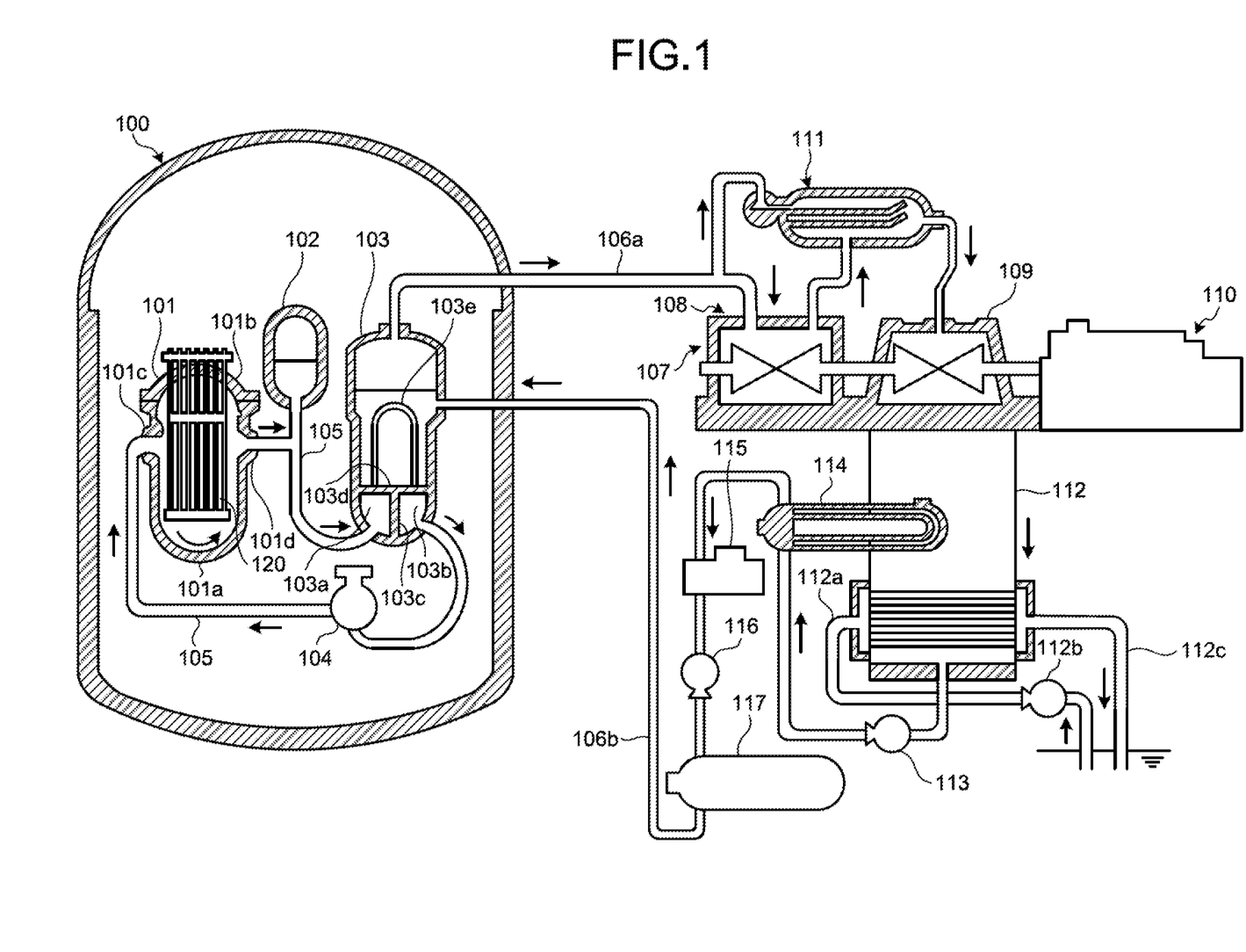
FIG. 1 is a schematic diagram illustrating an example of a nuclear reactor power plant.
Figure 2:
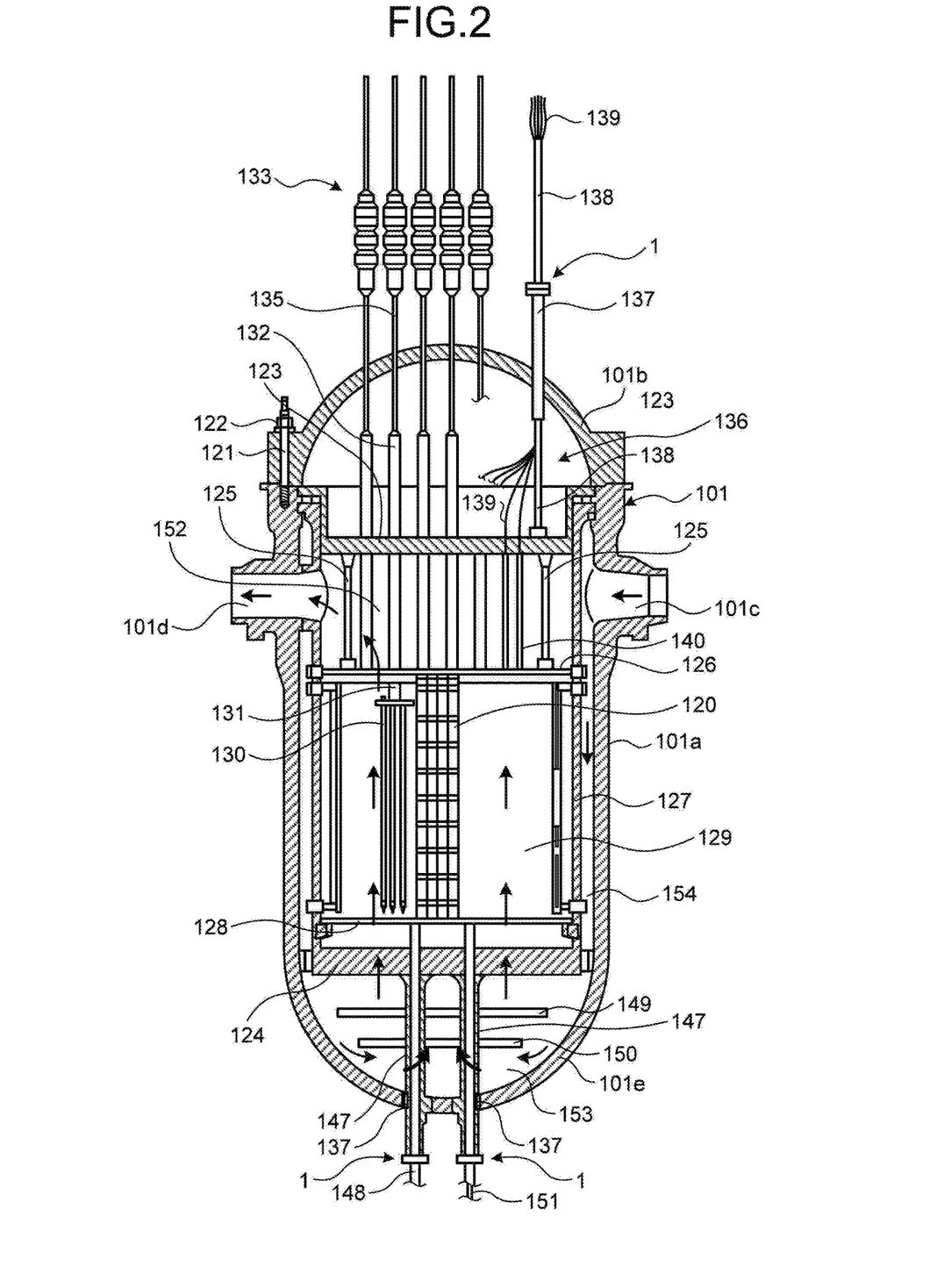
FIG. 2 is a vertical cross-sectional view of a pressurized water reactor.

FIG. 1 is a schematic diagram illustrating an example of a nuclear reactor power plant, and FIG. 2 is a vertical cross-sectional view of a pressurized water reactor.

The nuclear reactor power plant illustrated in FIG. 1 includes a pressurized water reactor (PWR). This nuclear reactor power plant has a circulation path for primary cooling water formed by sequentially connecting a reactor vessel 101, a pressurizer 102, a steam generator 103, and a primary cooling water pump 104 of the pressurized water reactor via a primary cooling water pipe 105 inside a containment 100.

The reactor vessel 101 is adapted to store a fuel assembly 120 inside thereof in a sealed state, and is formed of a reactor vessel main body 101a and a reactor vessel lid 101b placed above it such that the fuel assembly 120 can be inserted and removed. The reactor vessel main body 101a has an upper portion provided with an inlet side nozzle 101c and an outlet side nozzle 101d to supply and discharge light water as the primary cooling water. The outlet side nozzle 101d is connected to the primary cooling water pipe 105 so as to communicate with an inlet side water chamber 103a of the steam generator 103. Also, the inlet side nozzle 101c is connected to the primary cooling water pipe 105 so as to communicate with an outlet side water chamber 103b of the steam generator 103.

The steam generator 103 has a lower portion having a hemispherical shape, and the inlet side water chamber 103a and the outlet side water chamber 103b are partitioned by a partitioning plate 103c in this lower portion. The inlet side water chamber 103a and the outlet side water chamber 103b are partitioned from an upper portion side of the steam generator 103 by a tube sheet 103d provided at a ceiling portion in each of the water chambers. The upper portion side of the steam generator 103 is provided with a heat transfer pipe 103e having an inverted U-shape. The heat transfer pipe 103e has end portions supported by the tube sheet 103d so as to connect the inlet side water chamber 103a to the outlet side water chamber 103b. Additionally, the inlet side water chamber 103a is connected to the primary cooling water pipe 105 on the inlet side, and the outlet side water chamber 103b is connected to the primary cooling water pipe 105 on the outlet side. Furthermore, in the steam generator 103, an upper end on the upper portion side partitioned by the tube sheet 103d is connected to a secondary cooling water pipe 105a on an outlet side, and a side portion on the upper portion side is connected to a secondary cooling water pipe 105b on an inlet side.

Additionally, the nuclear reactor power plant has a circulation path for secondary cooling water by connecting the steam generator 103 to a steam turbine 107 via the secondary cooling water pipes 106a, 105b outside the containment 100.

The steam turbine 107 includes a high pressure turbine 108 and a low pressure turbine 109 and is further connected to a generator 110. Additionally, the high pressure turbine 108 and the low pressure turbine 109 have a moisture separation heater 111 connected in a manner branched from the secondary cooling water pipe 106a. Furthermore, the low pressure turbine 109 is connected to a condenser 112. The condenser 112 is connected to the secondary cooling water pipe 106b. As described above, the secondary cooling water pipe 106b is connected to the steam generator 103, extends to the steam generator 103 from the condenser 112, and is provided with a condensate pump 113, a low pressure water supply heater 114, a deaerator 115, a main water supply pump 116, and a high pressure water supply heater 117.

Therefore, in the nuclear reactor power plant, the primary cooling water is supplied to the steam generator 103 via the primary cooling water pipe 105 while the primary cooling water is heated in the reactor vessel 101 to become a high temperature/high pressure state, and pressurized in the pressurizer 102 to keep the pressure constant. In the steam generator 103, the secondary cooling water is evaporated to become steam by performing heat exchange between the primary cooling water and the secondary cooling water. The cooled primary cooling water after heat exchange is collected on the primary cooling water pump 104 side via the primary cooling water pipe 105 and then returned to the reactor vessel 101. On the other hand, the secondary cooling water that has become steam by heat exchange is supplied to the steam turbine 107. The steam enters the steam turbine 107, and the moisture separation heater 111 removes moisture from exhaust air coming out from the high pressure turbine 108, and further heats the steam, and then sends the same to the low pressure turbine 109. The steam turbine 107 is driven by the steam of the secondary cooling water, and motive power thereof is transmitted to the generator 110 and generates power. The steam used to drive the turbine is discharged to the condenser 112. The condenser 112 performs heat exchange between cooling water (such as seawater) collected by a pump 112 via an intake pipe 112a and the steam discharged from the low pressure turbine 109, and condenses the steam to restore the same to saturated liquid having a low pressure. The cooling water used for heat exchange is discharged from a discharge pipe 112c. Furthermore, the condensed saturated liquid is used as the secondary cooling water and sent out to the outside of the condenser 112 by the condensate pump 113 via the secondary cooling water pipe 106b. Then, the secondary cooling water passing through the secondary cooling water pipe 106b is heated in the low pressure water supply heater 114 by, for example, low pressure steam extracted from the low pressure turbine 109, and is sent by a main water supply pump 116 after dissolved oxygen and impurities such as a non-condensed gas (ammonia gas) are removed in the deaerator 115. Subsequently, the secondary cooling water is heated in the high pressure water supply heater 117 by, for example, high pressure steam extracted from the high pressure turbine 108 and then returned to the steam generator 103.

In the pressurized water reactor of the nuclear reactor power plant thus structured, as illustrated in FIG. 2, the reactor vessel 101 has the reactor vessel lid 101b fixed to the reactor vessel main body 101a by a plurality of stud bolts 121 and nuts 122 in an openable manner such that core internals including the fuel assembly 120 can be inserted inside thereof.

The reactor vessel main body 101a has an upper portion openable by detaching the reactor vessel lid 101b, and is formed in a cylindrical shape closed by a lower mirror 101e having a lower portion formed in a hemispherical shape. Inside the reactor vessel main body 101a, an upper core support 123 is fixed at a position higher than the inlet side nozzle 101c and an outlet side nozzle bid while a lower core support 124 is fixed at a position near the lower mirror 101e located on the lower side. The upper core support 123 and the lower core support 124 are each formed in a disk shape and formed with many flow holes not illustrated. Additionally, the upper core support 123 has a lower side connected to an upper core plate 126 via a plurality of core support rods 125, and many flow holes not illustrated are formed on this upper core plate.

Inside the reactor vessel main body 101a, a core barrel 127 formed in a cylindrical shape is arranged keeping a predetermined clearance from an inner wall surface, and the core barrel 127 has an upper portion connected to the upper core plate 126 and has a lower portion connected to a lower core plate 128 having a disk shape and formed with many flow holes not illustrated. Additionally, the lower core plate 128 is supported by the lower core support 124. In other words, the core barrel 127 is supported by the lower core support 124 of the reactor vessel main body 101a.

A reactor internal 129 is formed of the upper core plate 126, the core barrel 127, and the lower core plate 128. The reactor internal 129 has many fuel assemblies 120 arranged inside thereof. The fuel assembly 120 is foamed in a lattice shape by bundling many fuel rods with a support lattice although not illustrated, and the upper nozzle is fixed at an upper end portion thereof while a lower nozzle is fixed at a lower end portion thereof. Additionally, the reactor internal 129 has many control rods 130 arranged inside thereof. These many control rods 130 have upper end portions gathered together to constitute a control rod cluster 131, and can be inserted into the fuel assembly 120. The upper core support 123 is fixed with many control rod cluster guide pipes 132 penetrating the upper core support 123, and a lower end portion of each of the control rod cluster guide pipes 132 extends to the control rod cluster 131 located inside the fuel assembly 120.

The reactor vessel lid 101b constituting the reactor vessel 101 is provided with a control rod driving mechanism 133 of a magnetic jack type, and an upper portion of the control rod driving mechanism is formed in a hemispherical shape. Each of the many control rod cluster guide pipes 132 has an upper end portion extending to the control rod driving mechanism 133, and a control rod cluster drive shaft 135 extending from the control rod driving mechanism 133 passes through the inside of the control rod cluster guide pipe 132, extends to the fuel assembly 120, and can hold the control rod cluster 131.

The control rod driving mechanism 133 is arranged in a manner extending in a vertical direction and connected to the control rod cluster 131, and further controls output of the nuclear reactor by moving up and down the control rod cluster drive shaft 135 by the magnetic type jack. The control rod cluster drive shaft 135 is made by providing a plurality of circumferential grooves on the surface of the control rod driving mechanism at an equal pitch in a longitudinal direction.

Furthermore, a measurement instrument guiding device 136 is arranged inside the reactor vessel 101 from the upper core support 123 to the upper core plate 126 and the fuel assembly 120. The measurement instrument guiding device 136 inserts a measurement instrument (not, illustrated) such as a thermocouple into the reactor internal 129 from an instrumentation nozzle (nozzle) 137 provided at the reactor vessel lid 101b. Therefore, in the case where a thermocouple is applied as the measurement instrument, a temperature inside the reactor internal 129 can be measured by the thermocouple.

In the guiding device 136, a support post 138 having a tubular shape is provided in an erected manner on the upper core support 123. The support post 138 is provided in a manner penetrating the reactor vessel lid 101b by having an upper end portion thereof inserted through the instrumentation nozzle 137 and made extending to the outside of the instrumentation nozzle 137. Additionally, a nozzle seal structure 1 of the present embodiment is provided between the instrumentation nozzle 137 and the support post 138, and the nozzle seal structure 1 hermetically seals a space between the instrumentation nozzle 137 and the support post 138. The support post 138 has a plurality of outlet pipes 139 inserted. The outlet pipe 139 has an inner diameter through which a measurement instrument can be inserted, and is provided in a manner extending to the support post 138 located outside the nozzle seal structure 1. Additionally, the outlet pipe 139 has an upper portion side supported by a support piece (not illustrated) and housed inside the support post 138, and has a lower portion side extending to the outside from a halfway of the support post 138, and each outlet pipe is inserted into an outlet guide pipe 140 disposed inside the core support rod 125. Furthermore, the outlet pipe 139 has a lower end portion penetrating the upper core plate 126 from a lower end of the outlet guide pipe 140 and communicates with the reactor internal 129.

Additionally, the reactor vessel main body 101a is provided with many instrumentation nozzles 146 penetrating the lower mirror 101e, and an in-core guide pipe 147 is inserted through each of the instrumentation nozzles 146. Each of the in core guide pipes 147 has an upper end portion connected to the lower core support 124, and is mounted with upper and lower connecting plates 149, 150 to suppress vibration. Additionally, the in-core guide pipe 147 is provided in a manner penetrating the lower mirror 101e by having a lower end portion thereof inserted through the inside of the instrumentation nozzle 146 and made extending to the outside of the instrumentation nozzle 146. The in-core guide pipe 147 has a plurality of outlet pipes 148 inserted. The outlet pipe 148 is provided in a manner extending to the lower core plate 128 and has a thimble tube 151 inserted through, and a measurement instrument (not illustrate) is inserted into the thimble tube. The thimble tube 151 passes through the in-core guide pipe 147 via the outlet pipe 148, penetrates the lower core plate 128, and can be inserted into the fuel assembly 120.

The pressurized water reactor having the above-described structure controls nuclear fission inside the reactor internal 129 by moving the control rod cluster drive shaft 135 to pull out the control rod 130 by a predetermined distance from the fuel assembly 120 by using the control rod driving mechanism 133, and light water filled inside the reactor vessel 101 is heated by generated heat energy and the light water having a high temperature is discharged from the outlet side nozzle 101d. In other words, in the event of nuclear fission of the nuclear fuel constituting the fuel assembly 120, neutrons are emitted, and the light water used as a moderator and the primary cooling water reduces kinetic energy of the emitted fast neutrons to generate thermal neutrons and easily causes additional nuclear fission, and further removes the generated heat for cooling. On the other hand, the number of neutrons generated inside the reactor internal 129 is adjusted by inserting the control rod 130 into the fuel assembly 120, and furthermore the nuclear reactor can be urgently stopped by inserting all of the control rods 130 into the fuel assembly 120. In the reactor vessel 101, an upper plenum 152 communicating with the outlet side nozzle 101d is formed above and a lower plenum 153 is formed below relative to the reactor internal 129. Additionally, a down-comer portion 154 communicating with the inlet side nozzle 101c and the lower plenum 153 is formed between the reactor vessel 101 and the core barrel 127. Therefore, the light water flows into the reactor vessel main body 101a from the inlet side nozzle 101c, flows downward in the down-comer portion 154, reaches the lower plenum 153, flows upward by being guided upward by a spherical inner surface of the lower plenum 153, and flows into the reactor internal 129 after passing through the lower core support 124 and the lower core plate 128. While the light water having flown into the reactor internal 129 cools the fuel assembly 120 by absorbing heat energy generated from the fuel assembly 120 constituting the reactor internal 129, the light water having a high temperature passes through the upper core plate 126, flows up to the upper plenum 152, and is discharged passing through the outlet side nozzle 101d. The light water discharged from the reactor vessel 101 is sent to the steam generator 103 as described above.

Figure 3:
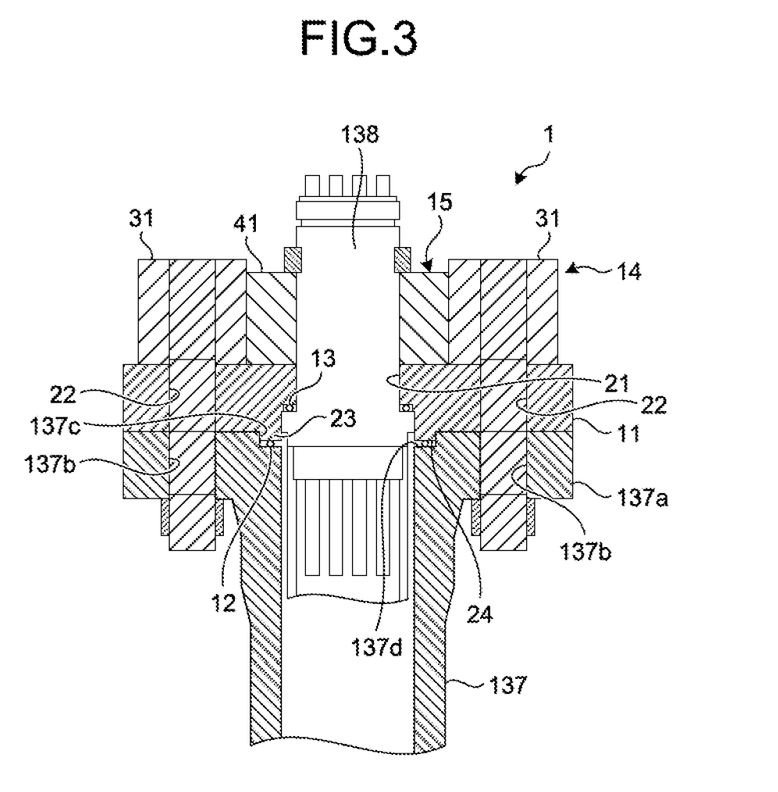
FIG. 3 is a cross-sectional view of a nozzle seal structure of the present embodiment.
Figure 4:
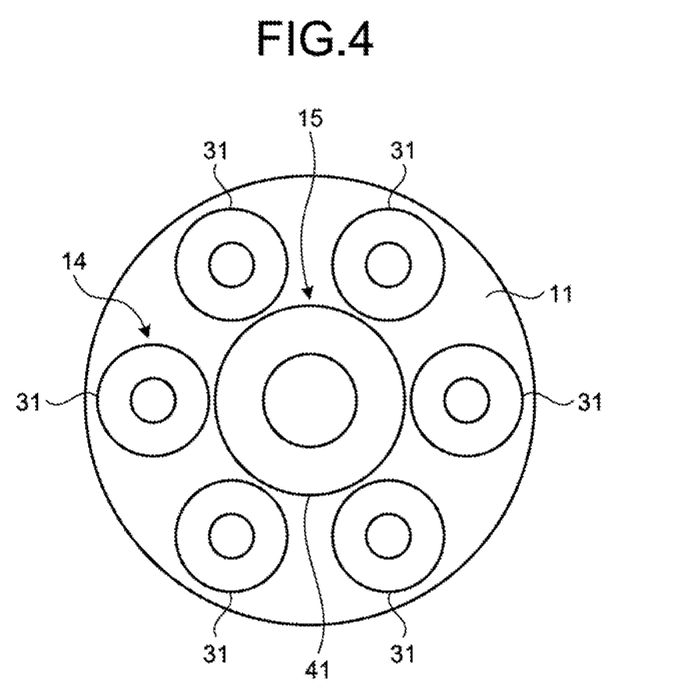
FIG. 4 is a plan view of the nozzle seal structure of the present embodiment.
Figure 5:
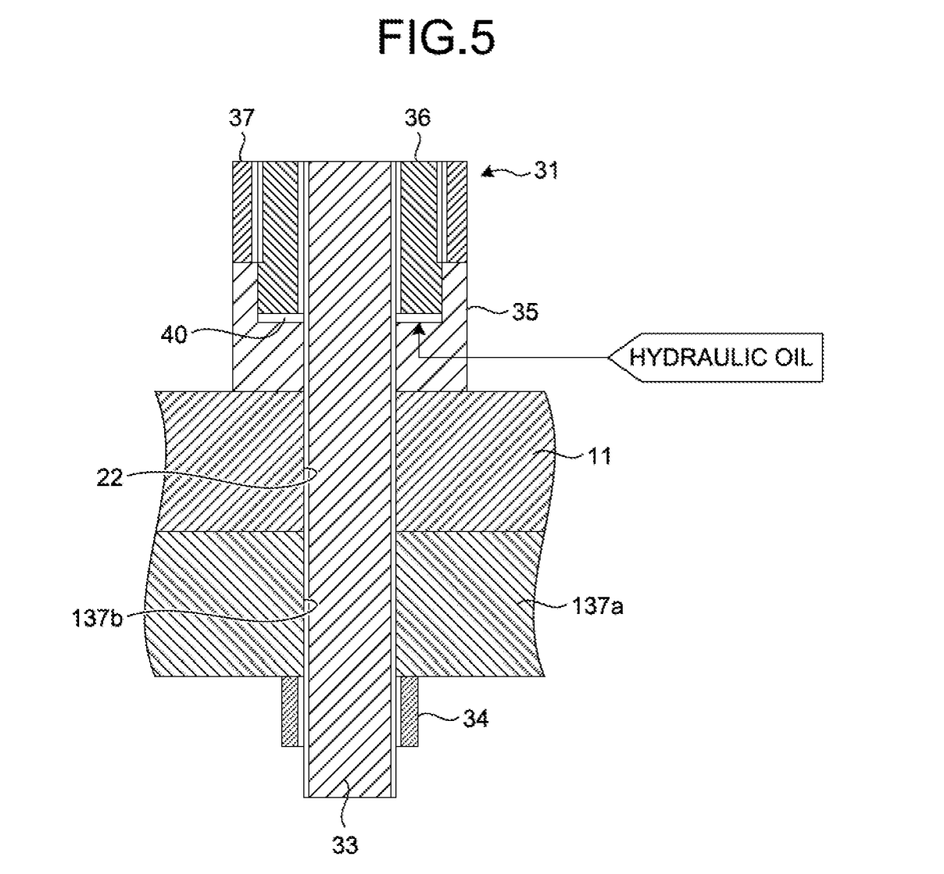
FIG. 5 is a cross-sectional view of a first hydraulic lock mechanism.
Figure 6:
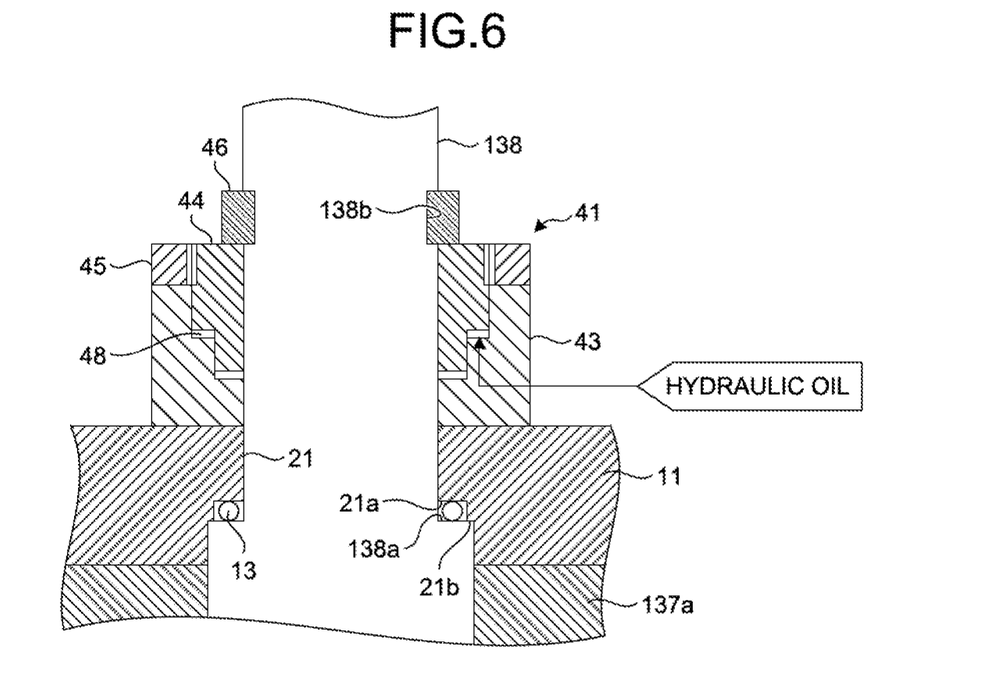
FIG. 6 is a cross-sectional view of a second hydraulic lock mechanism.

Next, the nozzle seal structure 1 of the present embodiment will be described with reference to FIGS. 3 to 6. FIG. 3 is a cross-sectional view of the nozzle seal structure of the present embodiment. FIG. 4 is a plan view of the nozzle seal structure of the present embodiment. FIG. 5 is a cross-sectional view of a first hydraulic lock mechanism. FIG. 6 is a cross-sectional view of a second hydraulic lock mechanism.

The nozzle seal structure 1 is adapted to hermetically seal a space between the nozzle provided in a manner penetrating the reactor vessel 101 from the inside to the outside and a rod member such as the support post 138 or the in-core guide pipe 147, and for example, hermetically seals the space between the instrumentation nozzle 137 and the support post 138 or a space between the instrumentation nozzle 146 and the in-core guide pipe 147 as described above. In the following description, note that a description will be provided by applying the nozzle seal structure 1 that hermetically seals the space between the instrumentation nozzle 137 and the support post 138.

As illustrated in FIG. 3, the instrumentation nozzle 137 includes a flange portion 137a provided at an upper end portion thereof in a manner projecting outward in a radial direction orthogonal to a nozzle axis direction. The flange portion 137a is formed in an annular shape and has a thickness direction coinciding with the nozzle axis direction. The flange portion 137a is formed with a plurality of fastening through-holes 137b provided at predetermined intervals in a circumferential direction. The fastening through-hole 137b is formed in the thickness direction of the flange portion 137a and has a hollow cylindrical shape. In the present embodiment, while six fastening through-holes 137b are formed, for example, hut note that the number thereof is not particularly limited and the fastening through-holes 137b are suitably provided conforming to the number of first hydraulic lock mechanisms 31 described below. Additionally, an engagement groove 137c is formed at an inner circumferential edge on the radially inner side of the flange portion 137a. The engagement grooves 137c are formed in a hollow annular shape along an entire circumference, and protecting portion 23 of a blocking member 11 described later is engaged therewith. Note that a bottom surface on the lower side of the engagement groove 137c is formed as a seal surface 137d with which a lower seal member 12 contacts.

The support post 138 inserted through the instrumentation nozzle 137 has a lower-side diameter formed as a large diameter and an upper-side diameter formed as a small diameter, thereby forming an annular-shaped stepped surface 138a. Additionally, a key groove 138b to be engaged with a key member 45 of a later-described second fastening portion 15 is formed on the upper side of the stepped surface 138a in an annularly recessed manner around an entire circumference thereof.

The nozzle seal structure 1 provided at the instrumentation nozzle 137 and the support post 138 includes the blocking member 11, the lower seal member (first seal member) 12, an upper seal member (second seal member) 13, a first fastening portion 14, and a second fastening portion 15.

The blocking member 11 is provided in a manner facing the flange portion 137a in the nozzle axis direction. The blocking member 11 is formed in a disk shape having a diameter substantially same as the diameter of the flange portion 137a. Therefore, the blocking member 11 has the thickness direction coinciding with the nozzle axis direction. The blocking member 11 is formed with: a support post through-hole 21 through which the support post 138 is inserted at a center; and a plurality of fastening through-holes 22 provided at predetermined intervals in a circumferential direction of the circumference of the support post through-hole 21. As illustrated in FIG. 6, the support post through-hole 21 has a diameter on the flange portion 137a side (lower side) formed as a large diameter, and has a diameter on the opposite side (upper side) of the flange portion 137a side formed as a small diameter. Furthermore, the support post through-hole 21 has a diameter at a middle portion between the lower side and the upper side smaller than the large diameter on the lower side and larger than the small diameter on the upper side. Additionally, in the support post through-hole 21, an upper side surface located at a stepped portion between the upper side and the middle portion is adapted as a seal surface 21*a* having an annular shape, and a lower side surface located thereof located at a stepped portion between the middle portion and the lower side is adapted as a position regulating surface 21*b* having an annular shape. The stepped surface 138*a* of the support post 138 contacts the position regulating surface 21*b*, and the stepped surface 138*a* of the support post 138 faces the seal surface 21*a* with the upper seal member 13 interposed therebetween. Therefore, a position of the support post 138 is regulated by the stepped surface 138*a* contacting the position regulating surface 21*b* of the blocking member 11. Additionally, since the support post 138 has the stepped surface 138*a* contacting the seal surface 21*a* of the blocking member 11 via the upper seal member 13, the space between the support post 138 and the blocking member 11 is hermetically sealed. The plurality of fastening through-holes 22 is formed conforming to the fastening through-hole 137*b* of the flange portion 137*a*, and for example, six fastening through-holes 22 are formed in the present embodiment. The fastening through-holes 22 are formed in the thickness direction of the blocking member 11, and each formed in a hollow cylindrical shape having a diameter substantially same as the diameter of the fastening through-hole 137*b* of the flange portion 137*a*.

Additionally, the blocking member 11 is formed with the projecting portion 23 having a rim slightly projecting on the lower side of the support post through-hole 21. The projecting portion 23 is engaged with the engagement groove 137*c* having an annular shape and formed in the inner circumferential edge of the flange portion 137*a*. An end surface on the lower side of the projecting portion 23 is formed as a seal surface 24 with which the lower seal member 12 contacts.

The lower seal member 12 is provided between the flange portion 137*a* and the blocking member 11, and for example, an O-ring is used. Specifically, the lower seal member 12 is arranged between the seal surface 137*d* of the flange portion 137*a* and the seal surface 24 of the blocking member 11. Furthermore, the lower seal member 12 is clamped by fastening the blocking member 11 and the flange portion 137*a* in a mutually approaching direction by the first fastening portion 14 described later, and consequently the space between the blocking member 11 and the flange portion 137*a* is hermetically sealed.

The upper seal member 13 is provided between the support post 138 and the blocking member 11, and for example, an O-ring is used. Specifically, the upper seal member 13 is arranged between the stepped surface 138*a* of the support post 138 and the seal surface 21*a* of the blocking member 11. Furthermore, the upper seal member 13 is clamped by relatively lifting the support post 138 to the upper side relative to the blocking member 11 by the second fastening portion 15 described later, and consequently the space between the blocking member 11 and the support post 138 is hermetically sealed.

The first fastening portion 14 is adapted to fasten the flange portion 137*a* and the blocking member 11. The first fastening portion 14 is formed by including a plurality of first hydraulic lock mechanisms 31. The plurality of first hydraulic lock mechanisms 31 is provided in a manner clamping the flange portion 137*a* and the blocking member 11 in the thickness direction. Additionally, the plurality of first hydraulic lock mechanisms 31 is provided conforming to the plurality of fastening through-holes 22. Therefore, as illustrated in FIG. 4, the plurality of first hydraulic lock mechanisms 31 is arranged at predetermined intervals parallel to the circumferential direction (along entire circumference) of each of the flange portion 137*a* and the blocking member 11.

Next, the first hydraulic lock mechanism 31 will be described with reference to FIG. 5. Note that a hydraulic lock bolt (also referred to as a hydraulic nut) is applied as the first hydraulic lock mechanism 31. The first hydraulic lock mechanism 31 includes a fastening bolt 33, a nut 34, a cylinder 35, a piston 36, and a lock nut 37.

The fastening bolt 33 is inserted through the fastening through-hole 137*b* of the flange portion 137*a* and the fastening through-hole 22 of the blocking member 11, and has an outer peripheral surface formed with a thread groove. The nut 34 has an inner peripheral surface formed with a thread groove, and is fastened with the fastening bolt 33 on the lower side of the flange portion 137*a*. Therefore, the lower surface of the flange portion 137*a* receives first fastening force via the nut 34 applied when the first hydraulic lock mechanism 31 is fastened.

The piston 36 has an outer peripheral surface and an inner peripheral surface each formed with a thread groove, and fastened with the fastening bolt 33 on the upper side of the blocking member 11. The cylinder 35 is arranged between the blocking member 11 and the piston 36. The cylinder 35 houses, inside thereof, part of the piston 36 on the lower side (blocking member 11 side) and forms a hydraulic chamber 40 between the cylinder 35 and the piston 36. When hydraulic oil is supplied, hydraulic pressure is applied to the hydraulic chamber 40. When the hydraulic pressure is applied to the hydraulic chamber 40, the hydraulic chamber 40 expands, thereby relatively moving the cylinder 35 and the piston 36 in direction away from each other. Accordingly, when the cylinder 35 pushes the blocking member 11 to the flange portion 137*a* side, the blocking member 11 and the flange portion 137*a* are clamped by the cylinder 35 and the nut 34. Therefore, the upper surface of the blocking member 11 is adapted as a first fastened surface that receives first fastening force applied when the first hydraulic lock mechanism 31 is fastened. The lock nut 37 is fastened to the outer peripheral surface of the piston 36 on the upper side of the cylinder 35. The lock nut 37 is adapted to fix positions of the cylinder 35 and piston 36. The lock nut 37 fixes the positions of the cylinder 35 and piston 35 by being fastened to the piston 36 so as to contact the cylinder 35 side in a state that the cylinder 35 and the piston 36 are apart from each other by hydraulic pressure.

Then, the plurality of first hydraulic lock mechanism 31 can apply the hydraulic pressure of the same level collectively to the respective hydraulic chambers 40. Therefore, the first fastening portion 14 can apply uniform first fastening force to the flange portion 137*a* and the blocking member 11 in the entire circumference.

The second fastening portion 15 is adapted to fasten the support post 138 and the blocking member 11. The second fastening portion 15 is formed by including a single second hydraulic lock mechanism 41. The second hydraulic lock mechanism 41 fastens the support post 138 and the blocking member 11 by lifting the support post 138 to the blocking member 11. Furthermore, as illustrated in FIG. 4, the second hydraulic lock mechanism 41 is provided in a manner surrounding the support post 138 at a center of the blocking member 11 parallel to the circumference direction (around the entire circumference) of each of the flange portion 137*a* and the blocking member 11.

Next, the second hydraulic lock mechanism 41 will be described with reference to FIG. 6. The second hydraulic lock mechanism 41 includes a cylinder 43, a piston 44, a lock nut 45, and a key member (locking member) 46.

The key member 46 is an annular member engaged with the key groove 138b formed at the support post 138. The key member 45 is formed in a manner projecting from the outer peripheral surface of the support post 138 in a state of being engaged with the key groove 138b.

The piston 44 has an outer peripheral surface formed with a thread groove, has the support post 138 inserted through an inner peripheral side thereof, and is provided between the blocking member 11 and the key member 46. The cylinder 43 is arranged between the blocking member 11 and the piston 44. The cylinder 43 houses, inside thereof, part of the piston 44 on the lower side (blocking member 11 side) and forms a hydraulic chamber 48 between the cylinder 43 and the piston 44. When hydraulic oil is supplied, the hydraulic chamber 48 is applied with hydraulic pressure. When the hydraulic pressure is applied to the hydraulic chamber 48, the hydraulic chamber 48 expands, thereby relatively moving the cylinder 43 and the piston 44 in direction away from each other. At this point, movement of the piston 44 in the nozzle axis direction is suppressed by the key member 46. Therefore, when the cylinder 43 moves the blocking member 11 to the flange portion 137a side, the cylinder 43 and the piston 44 enlarge a space between the blocking member 11 and the key member 46. Accordingly, the cylinder 43 and the piston 44 fasten the support post 138 and the blocking member 11 by lifting the support post 138 to the blocking member 11. Therefore, the upper surface of the blocking member 11 is adapted as a second fastened surface that receives second fastening force applied when the second hydraulic lock mechanism 41 is fastened. The lock nut 45 is fastened to an outer peripheral surface of the piston 44 on the upper side of the cylinder 43. The lock nut 45 is adapted to fix positions of the cylinder 43 and piston 44. The lock nut 45 fixes the positions of the cylinder 43 and piston 44 by being fastened to the piston 44 so as to contact the cylinder 43 side in a state that the cylinder 43 and the piston 44 are apart from each other by hydraulic pressure.

Thus, since the second hydraulic lock mechanism 41 is provided in a manner surrounding the support post 138, the second fastening portion 15 can apply the uniform second fastening force to the flange portion 137a and the blocking member 11 in the entire circumference by applying the hydraulic pressure to the hydraulic chamber 48.

Additionally, as described above, the upper surface of the blocking member 11 is adapted as the first fastened surface to receive the first fastening force applied by the first fastening portion, and also adapted as the second fastened surface to receive the second fastening force applied by the second fastening portion. Therefore, the first fastened surface and the second fastened surface are formed on the same surface.

Figure 7:
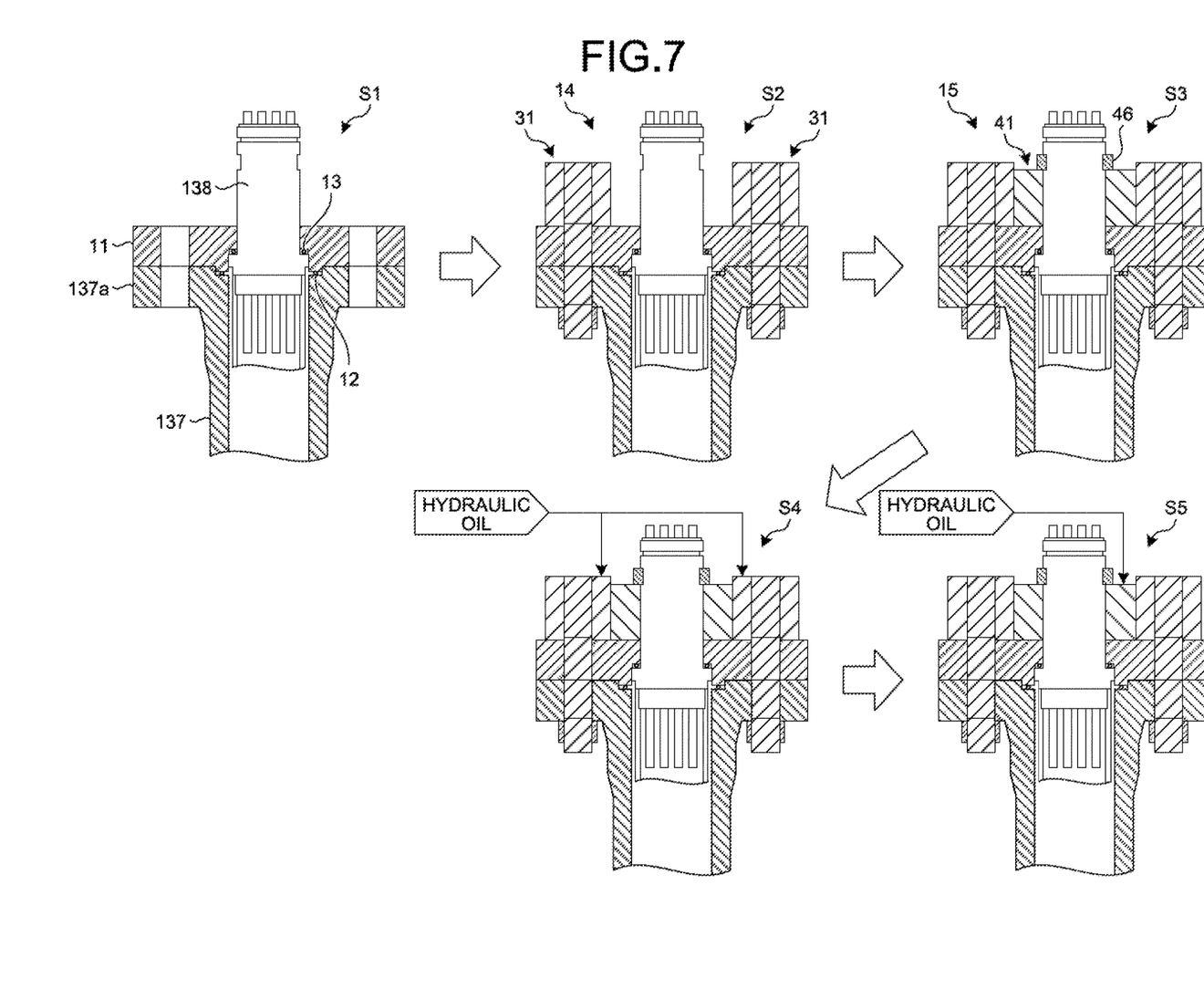
FIG. 7 is an explanatory diagram related to a mounting method of the nozzle seal structure of the present embodiment.

Next, mounting work to mount the nozzle seal structure 1 on the instrumentation nozzle 137 will be described with reference to FIG. 7. First, the blocking member 11 is arranged on the flange portion 137a of the instrumentation nozzle 137 (Step S1). In Step S1, a position of the blocking member 11 relative to the flange portion 137a is adjusted such that each of the fastening through-holes 137b of the flange portion 137a overlaps with each of the fastening through-holes 22 of the blocking member 11.

Subsequently, the first fastening portion 14 is arranged in a manner clamping the flange portion 137a and the blocking member 11 (Step S2). Specifically, in Step S2, the plurality of first hydraulic lock mechanisms 31 is respectively mounted on the respective fastening through-holes 137b and the respective fastening through-holes 22. In Step S2, after the plurality of first hydraulic lock mechanisms 31 is mounted, the second fastening portion 15 is subsequently arranged in the support post 138 and the blocking member 11 (Step S3). Specifically, in Step S3, the single second hydraulic lock mechanism 41 is mounted in the circumference of the support post 138.

Meanwhile, in Step S2, in the case all of the plurality of first hydraulic lock mechanisms 31 are mounted, mounting the second hydraulic lock mechanism 41 becomes difficult. Therefore, in practice, the second hydraulic lock mechanism 41 is mounted after part of the plurality of first hydraulic lock mechanisms 31 is mounted, and after that, the remaining first hydraulic lock mechanisms 31 are mounted.

In Step S3, when the second hydraulic lock mechanism 41 is mounted, fastening by the first fastening portion 14 is performed (Step S4). In other words, in Step S4, hydraulic pressure of the same level is collectively applied to the plurality of first hydraulic lock mechanisms 31 by supplying hydraulic oil from a hydraulic device not illustrated. After that, in that state that the hydraulic pressure is applied, the lock nut 37 in each of the first hydraulic lock mechanisms 31 is fastened, and then the hydraulic pressure is released.

After fastening by the first fastening portion 14 is performed in Step 4, fastening by the second fastening portion 15 is performed (Step S5). In other words, in Step S5, hydraulic pressure is applied to the second hydraulic lock mechanism 41 by supplying hydraulic oil from a hydraulic device not illustrated. After that, in that state that the hydraulic pressure is applied, the lock nut 45 of the second hydraulic lock mechanisms 41 is fastened, and then the hydraulic pressure is released. With the above procedure, the mounting work of the nozzle seal structure 1 on the instrumentation nozzle 137 is completed.

As described above, according to the present embodiment, since the blocking member 11 is formed in a disk shape, a distance in the nozzle axis direction between the lower seal member 12 and the upper seal member 13 can be shortened compared to a case where a blocking member is formed in a cylindrical shape. Therefore, since the lower seal member 12 and the upper seal member 13 can be set close to each other, visual check for the lower seal member 12 and the upper seal member 13 can be appropriately performed when visual check is performed from the lower side where the lower seal member 12 and the upper seal member 13 of the blocking member 11 are arranged. Therefore, since visibility of the lower seal member 12 and the upper seal member 13 can be improved, visual inspection and the like can be appropriately performed, for example.

Furthermore, according to the present embodiment, since the first fastened surface and the second fastened surface can be formed on the same surface, namely, the upper surface of the blocking member 11, fastening work for the first fastening portion 14 and the second fastening portion 15 can be performed on the same surface. As a result, workability can be improved. Moreover, since the first fastened surface and the second fastened surface are formed on the same surface, the shape of the blocking member 11 can be made compact. Consequently, space saving for the nozzle seal structure 1 can be achieved.

Additionally, according to the present embodiment, since the upper seal member 13 between the support post 138 and the blocking member 11 can be clamped by fastening the support post 138 and the blocking member 11 with the second hydraulic lock mechanism 41, the space between the support post 138 and the blocking member 11 can be hermetically sealed. At this point, since the second hydraulic lock mechanism 41 can apply the second fastening force by hydraulic pressure, pressure can be uniformly applied along the circumference of the support post 138 without unevenly applying a load to the upper seal member 13 in the circumference of the support post 138. Therefore, reliability of sealing performance by the upper seal member 13 can be improved.

Additionally, according to the present embodiment, the second hydraulic lock mechanism 41 can be locked to the support post 138 by the key member 46. Therefore, the second hydraulic lock mechanism 41 can move the support post 138 via the key member 46. Accordingly, the support post 138 can be lifted relative to the blocking member 11 by the second hydraulic lock mechanism 41 without providing any thread groove on the outer peripheral surface of the support post 138.

Moreover, according to the present embodiment, since the lower seal member 12 between the flange portion 137a and the blocking member 11 can be clamped by fastening the flange portion 137a and the blocking member 11 with the plurality of first hydraulic lock mechanisms 31, the space between the flange portion 137a and the blocking member 11 can be hermetically sealed. At this point, since the plurality of first hydraulic lock mechanisms 31 can apply the first fastening force by hydraulic pressure, pressure can be uniformly applied along the circumference in each of the flange portion 137a and the blocking member 11 without unevenly applying a load to the lower seal member 12 in the circumference in each of the flange portion 137a and the blocking member 11. Therefore, reliability of sealing performance by the lower seal member 12 can be improved.

Additionally, according to the present embodiment, since hydraulic pressure of the same level is collectively applied to the plurality of first hydraulic lock mechanisms 31, the pressure can be uniformly applied along the circumference in each of the flange portion 137a and the blocking member 11 without unevenly applying a load to the lower seal member 12 in the circumference in each of the flange portion 137a and the blocking member 11.

Meanwhile, in the present embodiment, the first hydraulic lock mechanism 31 and the second hydraulic lock mechanism 41 are used in the first fastening portion 14 and the second fastening portion 15, hut not limited to this structure, fastening members such as a bolt and a nut may also be applied.

REFERENCE SIGNS LIST

1 Nozzle seal structure
11 Blocking member
12 Lower seal member (first seal member)
13 Upper seal member (second seal member)
14 First fastening portion
15 Second fastening portion
31 First hydraulic lock mechanism
41 Second hydraulic lock mechanism
46 Key member (locking member)
101 Reactor vessel
137 Instrumentation nozzle
137a Flange portion
138 Support post
138b Key groove

The invention claimed is:

1. A nozzle seal configured to hermetically seal a nozzle that penetrates a reactor vessel wall, the nozzle having a nozzle axis and including a coaxial rod member inserted there through, and a flange portion projecting outward from the nozzle in a radial direction at an end of the nozzle distal from an outer side of the reactor vessel, the nozzle seal comprising:
   a blocking member that is a plate having a thickness direction parallel to the nozzle axis and that is adjacent to the flange portion along the nozzle axis, the blocking member having a center portion through which the rod member passes;
   a first seal member provided between the flange portion and the blocking member;
   a second seal member provided between the rod member and the blocking member;
   a first fastening portion configured to fasten the flange portion and the blocking member; and
   a second fastening portion that is adjacent to the first fastening portion configured to fasten the rod member and the blocking member,
   the blocking member comprising:
   a first fastened surface configured to receive first fastening force applied by the first fastening portion; and
   a second fastened surface configured to receive second fastening force applied by the second fastening portion,
   wherein the first fastened surface and the second fastened surface are continuous and formed on a flat surface of the plate.

2. The nozzle seal according to claim 1, wherein
the blocking member is
where the rod member coaxially passes through the center of the blocking member, and
the first fastening portion includes a plurality of first hydraulic lock mechanisms arranged around the blocking member, the first hydraulic lock mechanisms being configured to apply the first fastening force by hydraulic pressure so that pressure is uniformly applied along a circumference of the flange portion, the first hydraulic lock mechanisms each comprising a first cylinder pressing the blocking member and a nut applying the first fastening force to the flange portion, and being configured to clamp the blocking member and the flange portion in the thickness direction between the first cylinder and the nut.

3. The nozzle seal according to claim 2, wherein the plurality of first hydraulic lock mechanisms are arranged at predetermined intervals along a circumferential direction of each of the flange portion and the blocking member, and when hydraulic pressure of a same level is collectively applied to the plurality of first hydraulic lock mechanisms, the first hydraulic lock mechanisms apply the first fastening force uniform to each other.

4. The nozzle seal according to claim 1, wherein
the blocking member is a disk where the rod member coaxially passes through the center of the blocking member, and
the second fastening portion includes a second hydraulic lock mechanism arranged in the center of the blocking member, the second hydraulic lock mechanism being configured to apply the second fastening force by hydraulic pressure so that pressure is uniformly applied along a circumference of the rod member, the second hydraulic lock mechanism comprising a second cylinder pressing the blocking member, and being configured to clamp the second seal member in the thickness direction between the second cylinder and the rod member.

5. The nozzle seal according to claim 4, wherein
the second fastening portion further includes a locking member configured to lock the second hydraulic lock mechanism and the rod member.

* * * * *